Figure 1:
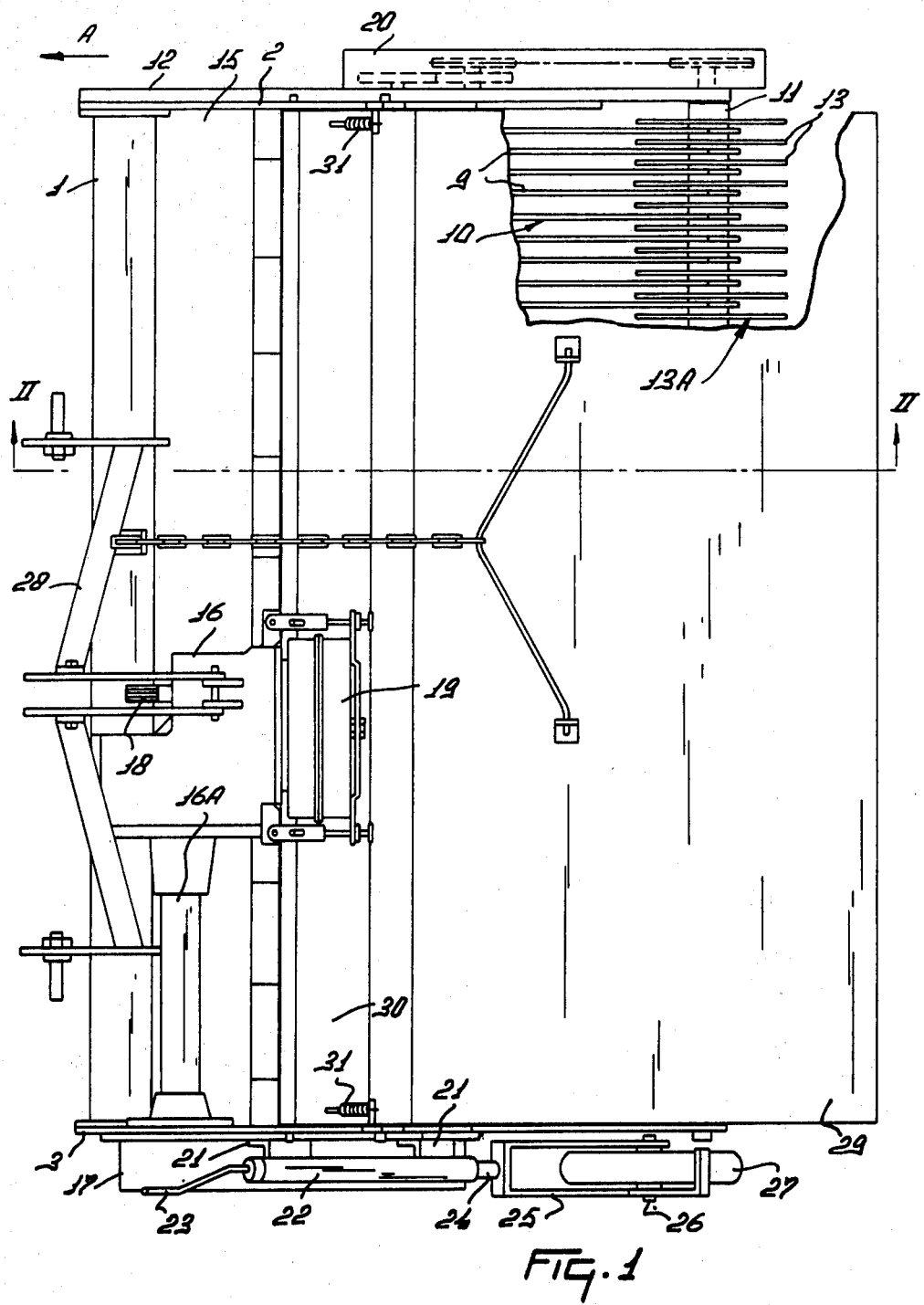

United States Patent [19]

van der Lely

[11] 4,051,902

[45] Oct. 4, 1977

[54] SOIL CULTIVATING IMPLEMENTS

[76] Inventor: Cornelis van der Lely, 7,Bruschenrain, Zug, Switzerland

[21] Appl. No.: 646,582

[22] Filed: Jan. 5, 1976

[30] Foreign Application Priority Data

Jan. 7, 1975 Netherlands .................. 7500137

[51] Int. Cl.² ............... A01B 33/02; A01B 33/16
[52] U.S. Cl. ................................. 172/32; 172/52; 172/55; 172/56; 172/68; 172/71; 172/112; 172/123; 172/177; 172/179; 172/604
[58] Field of Search .............. 172/1, 44, 48, 32, 50, 172/51, 52, 55, 56, 60, 63, 67, 68, 71, 112, 118, 120, 123, 174, 175, 177, 179, 184, 195, 197, 198, 694, 697, 604; 171/63-65, 105, 101

[56] References Cited

U.S. PATENT DOCUMENTS

| 185,484 | 12/1876 | Brott | 172/52 |
|---|---|---|---|
| 507,894 | 10/1893 | Emans | 172/604 X |
| 927,277 | 7/1909 | Peterson | 172/604 |
| 976,811 | 11/1910 | Kloss | 171/105 |
| 996,998 | 7/1911 | Muggli | 172/32 |
| 1,113,241 | 10/1914 | Niesz | 172/604 X |
| 1,986,715 | 1/1935 | Daniels | 171/101 |
| 2,066,610 | 1/1937 | Carlin | 172/50 X |
| 2,394,017 | 2/1946 | Seaman | 172/52 X |
| 2,473,770 | 6/1949 | Seaman | 172/32 X |
| 2,706,877 | 4/1955 | Caldwell | 171/63 |
| 2,972,384 | 2/1961 | Thome | 171/63 |
| 3,128,831 | 4/1964 | Arndt | 172/48 X |
| 3,761,132 | 9/1973 | Grable | 172/32 X |
| 3,826,314 | 7/1974 | van der Lely et al. | 172/112 X |

FOREIGN PATENT DOCUMENTS 389,023  6/1908  France ................... 172/52

Primary Examiner—Paul E. Shapiro
Attorney, Agent, or Firm—Mason, Mason & Albright

[57] ABSTRACT

A cultivating implement has one or more forward cultivating rotors that are driven to work the top soil. During this working, stones and debris are unearthed. At the rear of the cultivating members, one or more rows of soil working members are moved through the soil and these members are soil engaging members with edges that contact the stones and push the stones down into the subsoil. The soil engaging members can be discs with edges having projections and the discs can be driven to rotate in the same or opposite direction as the rotor. Alternatively, the soil engaging members can be bars that extend down into the soil. In either case, a sieve of rods or bars can be positioned behind the rotor to allow fine soil to pass while stones are guided downwardly in front of the fine soil. The lower ends of the soil engaging members can be interconnected with a horizontal shaft on which the discs are mounted. A protective hood overlies the rotor as well as the soil engaging discs or bars. Adjustable arms interconnect one or more rows of the discs to the frame and the rows of discs can be moved vertically relative to the remainder of the implement on these arms.

25 Claims, 6 Drawing Figures

SOIL CULTIVATING IMPLEMENTS

Usually, when working the soil by means of a soil cultivating implement it is not possible to remove stones and similar hard objects contained in the soil out of the worked layer of soil without utilising further measures. Various proposals have been made in the past to collect the stones and other hard objects contained in the worked layer of soil with the aid of all kinds of measures and to remove them subsequently. The measures required to do this and are frequently complicated and expensive, while it is still necessary to transport the collected stones and the like from the field.

According to the present invention there is provided a soil cultivating implement that includes a plurality of working members each lying substantially parallel to a plane extending in the intended direction of operative travel of the implement and at a spacing between immediately adjacent members such that in operation, during movement of the members across the ground, stones and the like are pressed into the subsoil. Such an implement is capable of providing in a simple and effective manner a layer of arable land free of stones and similar hard objects, since by providing working members lying substantially parallel to a plane extending in the intended direction of operative travel and disposed at such a small distance from one another that stones and the like are pressed into the subsoil during the passage of the members across the ground, during this movement of the implement large stones and the like contained in the layer of soil being worked are urged towards the bottom of the layer of arable soil, where they are pressed into the subsoil, the arable layer thus obtained being substantially free of such stones and similar hard objects whose size has an adverse effect on the growth of plants.

The invention also provides a method of removing stones from a layer of arable earth by urging the stones by mechanical means out of the layer of arable earth and into a subjacent layer.

Figure 2:
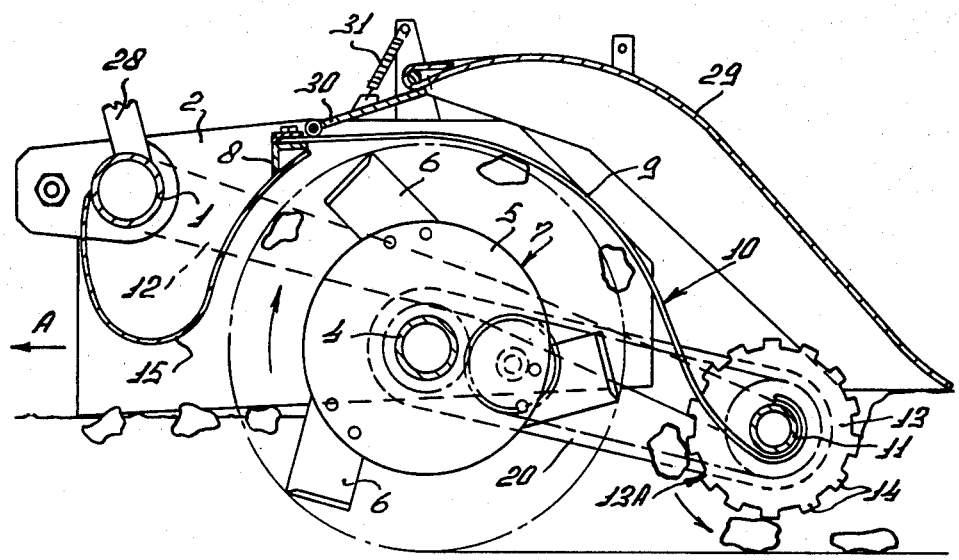
Figure 3:
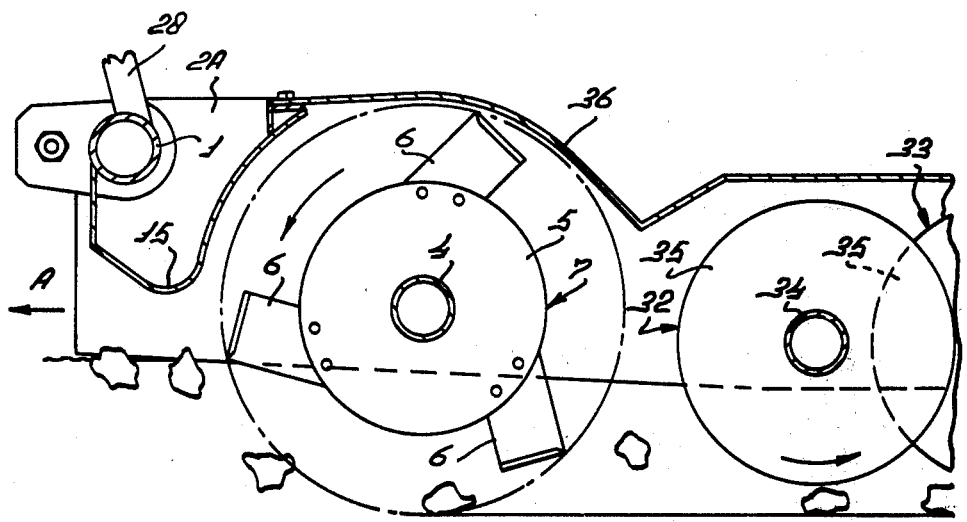
Figure 4:
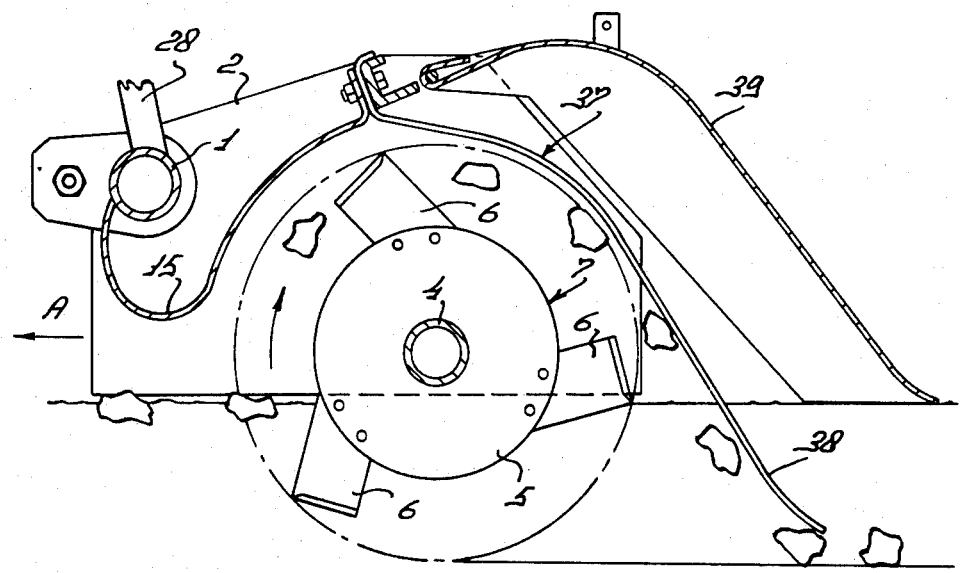
Figure 6:
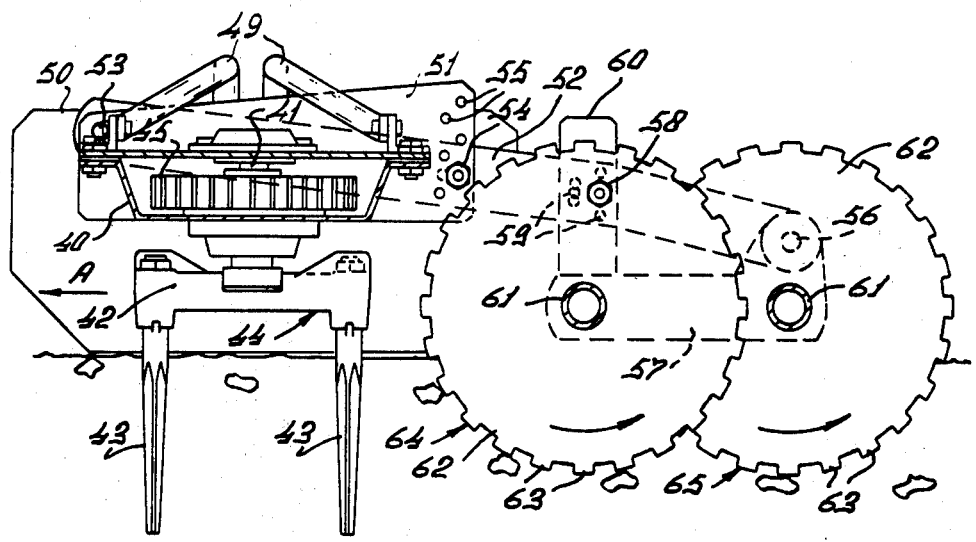
Figure 5:
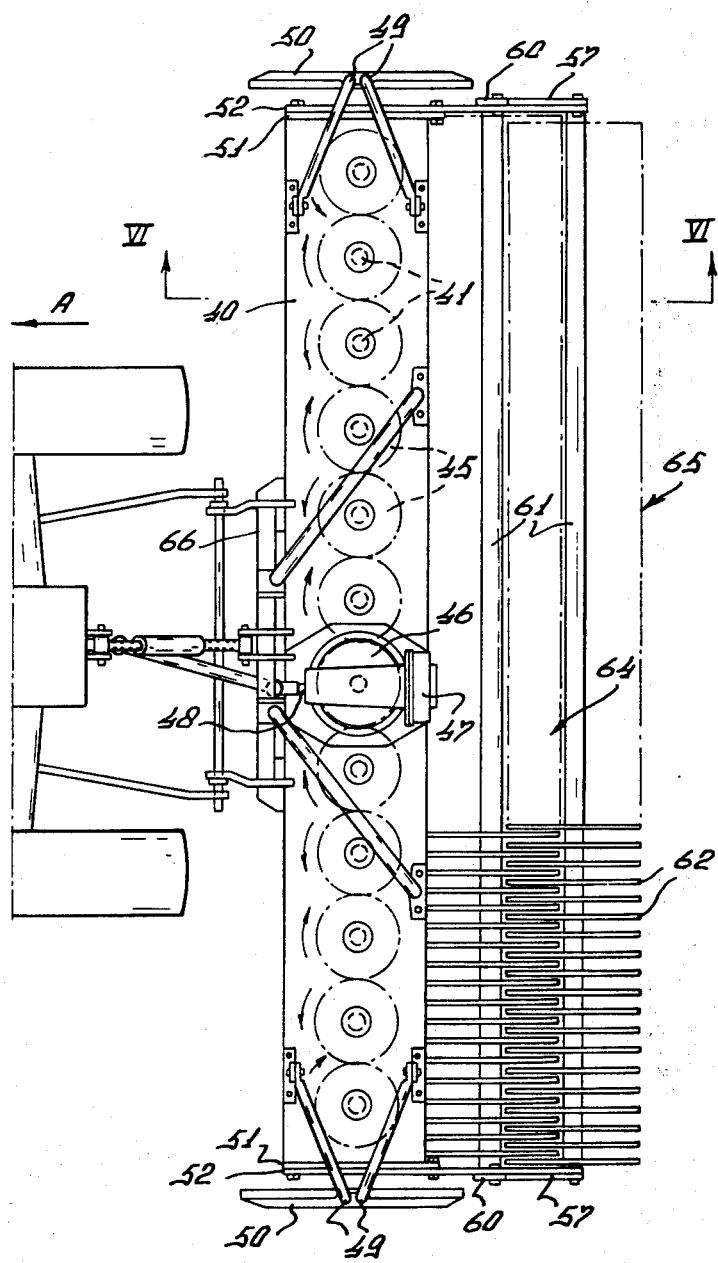

For a better understanding of the invention and to show how the same may be carried into effect, reference will now be made by way of example to the accompanying drawings, in which:

FIG. 1 is a plan view, partly broken away, of a first form of soil cultivating implement, FIG. 2 is a sectional side view taken on the line II—II in FIG. 1, FIG. 3 is a sectional side view similar to FIG. 2 but of a second form of implement, FIG. 4 is a sectional side view similar to FIG. 2 but of a third form of implement, FIG. 5 is a plan view of a fourth form of soil cultivating implement shown hitched to a tractor, and FIG. 6 is a sectional side view taken on the line VI—VI in FIG. 5.

The soil cultivating implement shown in FIGS. 1 and 2 has a frame that includes a frame beam 1 extending transversely of the intended direction of operative travel A of the implement and having vertical plates 2 and 3 secured to its ends. Near the lower edges of the plates 2 and 3 a rotary shaft 4 is mounted in bearings, this shaft 4 extending in a direction transverse of the direction of travel A and hence parallel to the frame beam 1. The rotary shaft 4 has secured to it at equal intervals circular plates or supports 5. At equal circumferential angles each support is provided with three cultivating members 6 formed by hooklike knives. The rotary shaft 4, the supports 5 and the cultivating members 6 constitute a rotor 7.

Between the plates 2 and 3 at the level of the frame beam 1 and to the rear thereof an angle-section iron 8 extends substantially parallel to the frame beam 1. At relative distances of about 30 mms bars 9 of resilinet material such as spring steel, together forming a sieve 10, are secured to the angle-section iron 8 and extend rearwardly therefrom, the bars 9 lying in the direction of travel A. Each bar 9 has a substantially circular cross-section, the diameter being of the order of from 10 to 20 mms. From FIG. 2 it will be apparent that away from the angle-section iron 8 the bars 9 initially extend in a horizontal direction to the rear, whereafter each bar has an arcuate portion that is substantially concentric with the rotary shaft 4. From the lower end of this arcuate portion each bar 9 curves upwardly and finally forwardly, surrounding the lower and rear portions of the curved wall of a shaft or tube 11 and terminating above the tube 11. By means of stub shafts the tube 11 is journalled in bearing secured to the plates 2 and 3. On it outer side the plate 2 is reinforced by means of a stay 12, which extends away from the frame beam 1 up to the tube 11. The tube 11 is provided with working members in the form of discs 13 each having a thickness of about 10 mms and being at a distance of about 30 mms from one another disposed such that on either side of each disc 13 one of the bars 9 of the sieve 10 curves around the tube 11. Although this is not shown, the tube 11 may have an angular cross-section and the discs 13 can be slipped by means of intermediate pieces onto the tube 11, which considerably facilitates mounting. Each disc 13 lies substantially parallel to a plane extending in the direction of operative travel A.

In the embodiment shown each disc 13 has a generally circular circumference. The tube 11, whose longitudinal center line constitutes a common rotary axis for the discs 13, is located at a lower level than the rotary shaft 4 of the rotor 7 and is located at a distance behind the rotary shaft 4 which is smaller than the diameter of the path described by the free ends of the cultivating members 6 of the rotor 7, formed by the hook-like knives (FIG. 2). The discs 13 in this embodiment have a diameter which is smaller than half the diameter of the path described by the free ends of the cultivating members 6 of the rotor 7. At the circumference each of the discs 13 has projections 14, located at equal distances from one another around the circumference and having an angular shape.

Between the angle-section iron 8 and the frame beam 1 a protective screen 15 is formed by a plate extending forwardly away from the angle-section iron at first substantially concentrically with the rotary shaft 4, passing through a curved part and terminating in an upwardly extending part, the top edge of which is secured to the front of the frame beam 1.

Near its midpoint the frame beam 1 carries a gear box 16. In the gear box 16 is journalled a shaft arranged in a tube 16A and extending substantially parallel to the frame beam 1. This shaft is coupled with the rotary shaft 4 through a transmission gear contained in a protective casing 17, which extends along the outer face of the plate 3. At its end located in the gear box 16 the shaft is provided with a bevel gear wheel which is in mesh with a bevel gear wheel on a shaft 18. This shaft 18 extends in the direction of travel A and projects from the front of the gear box 16 for coupling via an auxiliary shaft with the power take-off shaft of a tractor propelling the implement. The driving mechanism also includes a change-speed gear 19 located on the rear of the gear box 16. Furthermore the plate 2 is provided with a protective casing 20 accommodating a transmission gear constituting a driving connection between the rotary shaft 4 and one end of the tube 11 carrying the discs 13, this tube 11 together with the discs 13 forming a rotatable member 13A. The transmission is such that in operation the rotor 7 is driven in a direction opposite the direction in which the discs 13 are driven (see arcuate arrows in FIG. 2).

On the rear of the protective casing 17 two relatively spaced supports 21 mount a tubular guide 22 in which a screw spindle 23 is adapted to co-operate in a manner not shown with a screwthreaded end of a tube 24 projecting from the lower end of the tubular guide. The tube 24 is provided at its end remote from the tubular guide 22 with a fork-shaped part 25, which is inclined downwardly and rearwardly. Near the ends the limbs of the fork-shaped part 25 hold between them a shaft 26, about which a ground wheel 27 is freely rotatable.

The frame beam 1 is provided with a trestle 28, with the aid of which the implement can be attached to the three-point lifting device of a tractor.

Substantially perpendicularly above the rotary shaft 4 is a protective hood 29 pivotally mounted between the plates 2 and 3, this hood covering the major part of the sieve 10 and the tube 11 interconnecting the bars 9 and carrying the discs 13, and dragging in operation by its rear edge along the ground surface. Between the front of the pivotable protective hood 29 and the rear of the angle-section iron 8 a covering plate 30 is pivotally arranged and held in a position as shown in FIG. 2 by means of a spring 31.

In operation the implement described above is coupled by means of the trestle 28 with the three-point lift of a tractor and through the auxiliary shaft and the driving gear described above the rotor 7 is driven to rotate, about a substantially horizontal axis extending transversely of the direction of travel A, in the direction indicated by an arcuate arrow in FIG. 2. By means of the driving gear contained in the protective casing 20 the rotatable member 13A is driven in the opposite direction as also shown by an arcuate arrow in FIG. 2.

The depth at which the cultivating members 6 of the rotor 7 work the soil can be adjusted by means of the ground wheel 27. In operation, when the implement is moving in the direction of the arrow A, these cultivating members 6 pass in the direction of travel A, at the adjusted depth, across the soil and throw displaced earth along the screen 15 upwardly and across the rotary shaft 4 to the rear. Earth is separated from hard objects such as stones and the like by being forced past between the bars 9 of the sieve 10 to the rear, whereas the stones are conducted on the inner side of the sieve 10 downwardly along the bars 9 to be urged down into the bottom of the furrows (made by the cultivating members 6) by means of the working members formed by the discs 13. The earth that has passed through the sieve 10 then covers these stones. The effect thus is that stones and the like contained in the layer to be worked by the cultivating members 6 and having a size exceeding the spacing of the bars 9 are forced down and pressed into the unworked soil beneath the layer of arable soil. Thus the worked layer of arable earth can be freed practically completely from stones, pieces of wood and similar objects that would otherwise tend adversely to affect the germination and growth of seeds or plants planted in the layer of arable earth. The removal of stones and the like from the worked layer of earth furthermore prevents an unwanted increase in the tare content of the harvest, especially potato and beet crops.

Since the layer of arable earth can be worked in the manner described above year after year, the tendency is for the stones each time to be pressed further down so that the conditions of the layer of arable earth are constantly improved to approach the optimum state required for the germination and growth of seeds and seedlings.

Since the discs 13 of the rotatable member 13A located behind the rotor 7 are mechanically driven, pressing down of the stones and the like is facilitated, while the projections 14 at the peripheries of the discs act for preventing the discs from sliding off the stones and the like. The discs 13 are located at such a spacing from one another that stones not allowed to pass between the bars 9 also cannot pass between the discs 13. The bars 9 of the sieve 10 located between the discs 13 not only serve to guide the stones and the like within reach of the discs but also operate as scrapers for preventing the spaces between the discs from becoming filled with earth, which is particularly important on wet, heavy soil.

In a smaller size the implement described above may also be employed for preparing the soil for sowing grass in gardens and parks.

FIG. 3 shows an embodiment in which parts corresponding with those of the preceding embodiment are designated by the same reference numerals. In this embodiment a sieve formed by bars is not provided. Behind the rotor 7 this embodiment has two rotatable members 32 and 33 mounted between a plate 2A and a plate corresponding to the plate 3, these plates extending further to the rear than the plates 2 and 3 of the first embodiment. The members 32 and 33 each include a plurality of working members in the form of discs 35 arranged on a shaft or tube 34. The two tubes 34 are parallel to one another and to the rotary shaft 4 of the rotor 7. Each disc 35 lies substantially parallel to a plane extending in the direction of operative travel A.

It will be seen from FIG. 3 that the tubes 34 are located substantially at the same level as the rotary shaft 4 of the rotor 7. The discs 35 on one tube 34 are located one between each two adjacent discs on the other tube, and the discs on one tube overlap those on the other tube a distance which amounts to about one third of the diameter of the discs, which is about 50 cms. The distance between two adjacent discs 35 of the same row is about 70 mms. The discs 35 of this embodiment have a smooth perphery and the diameter is larger than half the diameter of the path described by the free ends of the cultivating members 6 of the rotor 7. In this embodiment the tubes 34 with the discs 35 are freely rotatable and in operation the discs are driven by their ground contact, whereas the rotor 7 is driven so that in operation the cultivating members 6 pass across the soil in a direction opposite the direction of movement of the implement. As will be seen from the arcuate arrows in FIG. 3 the direction of rotation of the rotor 7 is the same as that of the discs 35 on the tubes 34.

The rotor 7 and the rows of discs 35 of the rotatable members 32 and 33, arranged behind the rotor, are covered on the top by means of a protective hood 36, which is secured to the angle-section iron 8 and has a downwardly directed sharp bend between the rotor 7 and the foremost row of discs 35. Above the members 32 and 33 the hood is substantially horizontal. The fronts of the discs 35 of the foremost rotatable member 32 are located in the direct proximity of the working range of the free ends of the cultivating members 6 of the rotor 7.

In operation stones and the like contained in the layer of earth to be cultivated are moved down in the embodiment of FIG. 3 by the cultivating members 6 of the rotor 7 (see FIG. 3) and are subsequently urged down to the bottom of the layer of arable earth by means of the discs 35 of the rotatable members 32 and 33 operating in tandem. The stones are pressed into the subsoil at the bottom of the furrows made by the cultivating members 6 of the rotor 7. As in the first embodiment the discs 35 of the rotatable members 32 and 33 of this embodiment extend down to a depth in the cultivated layer of soil which is about two thirds of the thickness of the layer cultivated.

In the embodiment shown in FIG. 4 the parts corresponding with those of the first embodiment are again denoted by the same reference numerals. In this embodiment a sieve 37 is formed by bars 38 extending from their fastening areas at first substantially concentrically with the rotary shaft 4 of the rotor 7 and each then passing through a downwardly and rearwardly inclined, straight part, which is bent over to the rear near its free end. The bars 38 are spaced apart by a distance of about 30 mms and have the same cross-section as the bars of the sieve 10 of the first embodiment. The ends of the bars 38, which constitute working members, extend down to at least two thirds of the depth of the layer of arable earth worked by the cultivating members 6 of the rotor 7. Each bar 38 lies substantially parallel to a plane extending in the direction of travel A. The bars 38 are covered by a pivotable screening hood 39, the bottom edge of which slides, in operation along the surface of the layer of earth cultivated. In this embodiment, as in the first embodiment, stones and similar hard objects contained in the layer worked by the cultivating members 6 of the rotor 7 and which would adversely affect the culture are slung along the screen 15 over and across the rotary shaft 4 against the bars 38 of the sieve 37, the earth passing between the bars and the stones and similar hard objects having a size exceeding the distance between the bars being guided down along the bars. The free ends of the bars bent over to the rear, as stated above, press the stones into the bottom of the furrows made by the cultivating members. Consequently the stones and similar hard objects are also forced downwards into the bottom of the furrows beneath the layer of cultivated earth, the stones being thus placed substantially beyond the worked layer of earth.

In the embodiment shown in FIGS. 5 and 6 the soil cultivating implement has a box-shaped frame portion 40, extending transversely of the direction of travel A and accommodating at equal intervals upwardly extending, preferably vertical, shafts 41. On the bottom the shafts 41 project out of the frame portion 40 and each is provided at this place with a substantially horizontal support 42 having at its ends downwardly extending, tapering tines 43. Each support 42 with its tines 43 constitutes a rotor 44 adapted to rotate about an upright shaft, the tines having straight, operative portions that trail with respect to the direction of operative rotation of the rotor (arcuate arrows FIG. 5). In operation the rotors work overlapping strips of soil.

Inside the hollow frame portion 40 the shafts 41 are provided with straight toothed gear wheels 45 with the gear wheels of each two adjacent shafts drivably interconneced. Near the midpoint of the portion 40 one of the shafts is prolonged upwardly into a gear box 46 in which this shaft is connected through a change-speed gear 47 with a shaft 48 extending in the direction of travel A to project from the front of the gear box for coupling by means of an auxiliary shaft with the power take-off shaft of a tractor propelling the implement.

At the ends of the frame portion 40 plates 50, extending in operation in a substantially vertical direction, are carried by arms 49 so as to be pivotable about axes extending in the direction of travel A.

An arm 52 is provided at each end of the hollow frame portion 40 so as to be pivotable along a tapering plate 51, whose narrower part is located at the front of the hollow frame portion 40, this arm 52 being pivotable about a stub shaft 53 near the front of the plate 51. The arms 52 can be set and fixed in any selected one of a plurality of positions by means of bolts 54, each of which can be passed through a hole in its arm 52 and through any one of a plurality of holes 55 at the rear of the adjacent plate 51. Near the rear end of each arm 52 a forwardly extending support 57 is pivotally mounted by means of a pin 56. Each of the supports 57 can be set and fixed in any selected one of a plurality of positions by means of a bolt 58, which can be passed through a hole in the arm 52 and through any one of a plurality of holes 59 in an arm 60 extending upwardly from the support 57. The ends of the supports 57 are provided with bearings receiving the ends of a shaft or tube 61, the rearmost of which is disposed substantially directly beneath the pins 56 and which tubes extend substantially parallel to one another and are provided each with working members in the form of discs 62. The discs on one tube are disposed each between two adjacent discs on the other tube and the distance between the tubes 61 is such that the discs 62 on one extend to near the other tube and overlap the discs on this other tube over a distance which is at least one fourth of the diameter of the discs, which is about 50 cms. The distance between two adjacent discs 62 of one row is about 70 mms and the thickness of the discs is about 10 mms. Around their circumferences the discs have angular extensions 63. The discs 62 and the tubes 61 constitute rotatable members 64 and 65 respectively. Each disc 62 lies substantially parallel to a plane extending in the direction of travel A. The fronts of the discs 62 of the member 64 are located within the working range of the rotors 44.

At the front the frame portion 40 is provided with a trestle 66, by means of which the implement can be attached to the three-point lift of a tractor, as illustrated in FIG. 5. In operation the rotors 44, arranged in a row extending transverse of the direction of operative travel A, are driven through the driving transmission described above from the power take-off shaft of the tractor with individual rotors rotating in the directions indicated by the arcuate arrows in FIG. 5. During the travel of the implement over the ground the rotatable members 64 and 65 disposed in tandem arrangement rotate in the directions indicated by the arcuate arrows in FIG. 6 driven by the ground contact of the discs 62, which have been previously set in positions relative to the frame portion 40 such that their lower edges penetrate into the soil to a depth equal to about two thirds of the thickness of the layer of arable earth worked by the tines 43 of the rotors 44. The stones contained in the layer of earth to be worked are pressed down in the manner described above beneath this layer so that also with this construction the layer of arable earth is practically completely freed of stones and similar hard objects which may be harmful to the growth of plants.

As in the embodiment of FIG. 3 the discs 62 of the two consecutive, rotatable members prevent filling of the space between the discs by their interleaved dispositions, which is particularly important on heavy, wet soil.

The implements described above can free a layer of arable earth practically completely from stones, wood and similar hard objects, the size of which might hinder crop growth and/or harvesting. This is particularly important for potato culture, in which the earth is moved into ridges and stones and the like might be carried into the harvester so that the tare content is adversely influenced. This also applies to a further, very important culture, sugar beet culture, in which stones and the like carried into the harvester would have an unfavourable effect on the results of the crop. The implements and the methods of soil cultivation described above provide, in addition, optimum conditions for germination of seeds or growth of seedlings planted in the layer of arable earth.

Although this is not illustrated, the discs of the embodiments of FIGS. 3 and 5 and 6 may also be arranged in the manner of the first embodiment, so that the mounting operation can be simplified. The discs of the front row may have a smaller diameter than those of the rear row. If desired only one row of discs can be provided, as in the embodiment of FIGS. 1 and 3 but unlike FIGS. 1 and 2, with the rotor 7 running in the same direction as the discs.

While various features of the soil cultivating implements that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. A soil cultivating implement comprising a frame and coupling means at the forward side of said frame that is connectable to a prime mover, soil working means on said frame and driving means connected to rotate said soil working means and work soil across a path that extends parallel to the direction of travel, a plurality of soil working members being rotatably mounted on horizontal shaft means positioned to the rear of said soil working means, said members being discs mounted side-by-side and spaced apart from one another on said shaft means by distances less than 10 cms and positioned to press stones and other debris down into the subsoil.

2. A soil cultivating implement as claimed in claim 1, wherein said soil working means includes a plurality of rotors and each rotor has at least one downwardly extending line.

3. A soil cultivating implement as claimed in claim 1, wherein said discs are freely rotatable on a common shaft.

4. A soil cultivating implement as claimed in claim 3, wherein said soil working means is rotatable about a horizontal shaft and the distance between the horizontal shaft of said discs and the axis of rotation of said soil working means exceeds the diameter of the path described by said soil working means.

5. A soil cultivating implement as claimed in claim 4, wherein said soil working means is a rotor with cultivating members and said discs are located within the working range of said cultivating members.

6. A soil cultivating implement as claimed in claim 5, wherein the horizontal shaft of said discs is located at a lower level than the rotary axis of said rotor.

7. A soil cultivating implement as claimed in claim 5, wherein, in operation, the peripheries of said discs extend into the soil over a distance at least equal to two thirds of the thickness of the layer of earth worked by said rotor.

8. A soil cultivating implement as claimed in claim 1, wherein said discs have projections around their edges and said projections are angular in shape.

9. A soil cultivating implement comprising a frame and coupling means at the forward side of said frame that is connectable to a prime mover, soil working means on said frame and driving means connected to rotate said soil working means and work soil across a path that extends parallel to the direction of travel, a plurality of soil contacting bars positioned to the rear of said soil working means and side-by-side in a row that extends transverse to the direction of travel, said bars forming a sieve and having lower ends that extend into the ground, said ends being connected to a shaft, a plurality of discs mounted on said shaft and said discs being spaced apart and positioned to receive stones and other debris from said sieve and press same down into the subsoil.

10. A soil cultivating implement as claimed in claim 9, wherein said soil working means is a rotor provided with a cultivating member.

11. A soil cultivating implement as claimed in claim 10, wherein immediately adjacent bars are spaced about 30 mms from one another.

12. A soil cultivating implement as claimed in claim 10, wherein said lower ends of the bars are bent over to the rear with respect to the direction of travel.

13. A soil cultivating implement as claimed in claim 10, wherein each of said bars extend in between two adjacent discs.

14. A soil cultivating implement as claimed in claim 13, wherein said ends of the bars are curved around said shaft.

15. A soil cultivating implement as claimed in claim 14, wherein the ends of said bars extend around the bottom and rear of said shaft.

16. A soil cultivating implement as claimed in claim 10, wherein said bars have a thickness of about 10 to 20 mms.

17. A soil cultivating implement as claimed in claim 10, wherein said bars are circular in cross-section.

18. A soil cultivating implement as claimed in claim 17, wherein said bars are made from spring steel.

19. A soil cultivating implement as claimed in claim 10, wherein said rotor is mounted to rotate about a substantially horizontal axis, and said sieve is partly concentric with that axis.

20. A soil cultivating implement as claimed in claim 10, wherein a plurality of rotors are arranged side-by-side and mounted to rotate about corresponding upright axes defined by shafts in a row that extends transverse to the direction of travel, said rotors each including soil working tine means.

21. A soil cultivating implement comprising a frame and coupling means at the forward side of said frame that is connectable to a prime mover, soil working means on said frame and driving means connected to rotate said soil working means and work soil across a path that extends transverse to the direction of travel, a plurality of soil working members rotatably mounted on said implement to the rear of said soil working means, said members being mounted side by side on at least one substantially horizontal shaft that extends transverse to the direction of travel, said members comprising substantial circular discs that extend generally parallel to the direction of travel, said discs being spaced apart from one another by a distance less than about 10 cms and positioned to press stones and other debris down into the subsoil, said discs having diameters that exceed said distance about ten fold.

22. A soil cultivating implement comprising a frame and coupling means at the forward side of said frame that is connectable to a prime mover, a plurality of soil engaging members mounted side by side in a row that extends transverse to the direction of travel, said members being bars that extend downwardly to the rear into the soil with respect to the normal direction of travel, said bars being interconnected to one another adjacent their lower ends and positioned to guide stones and other debris downwardly into subsoil, the lower ends of said bars being interconnected by a shaft that extends transverse to the direction of travel and a plurality of discs being mouned on said shaft.

23. A soil cultivating implement as claimed in claim 22, wherein said discs are mounted on a horizontal shaft that is rotated by said driving means.

24. A soil cultivating implement comprising a frame and coupling means at the forward side of said frame that is connectable to a prime mover, rotor means on said frame and driving means connected to rotate said rotor means and work soil across a path that extends transverse to the direction of travel, a plurality of soil working members rotatably mounted on said implement to the rear of said rotor means, said members being mounted side-by-side on a plurality shafts that extend transverse to the direction of travel, said members being generally circular spaced apart discs that extend substantially parallel to the direction of travel and positioned to press stones and other debris down into the subsoil, said discs being freely rotatable on their respective shafts located one behind the other with respect to the direction of travel, said discs being of substantially the same diameter and the discs on one shaft being positioned between the discs of a second shaft in interleaved fashion by a distance that approximates one fourth of that diameter.

25. A soil cultivating implement as claimed in claim 24, wherein a screening hood overlies said rotor means and said discs, said screening hood being pivoted to said frame and having a rear edge positioned to drag the ground surface during travel, said hood, viewed from the side, being sharply bent to form a depression between the rotor and said discs.

* * * * *